UNITED STATES PATENT OFFICE.

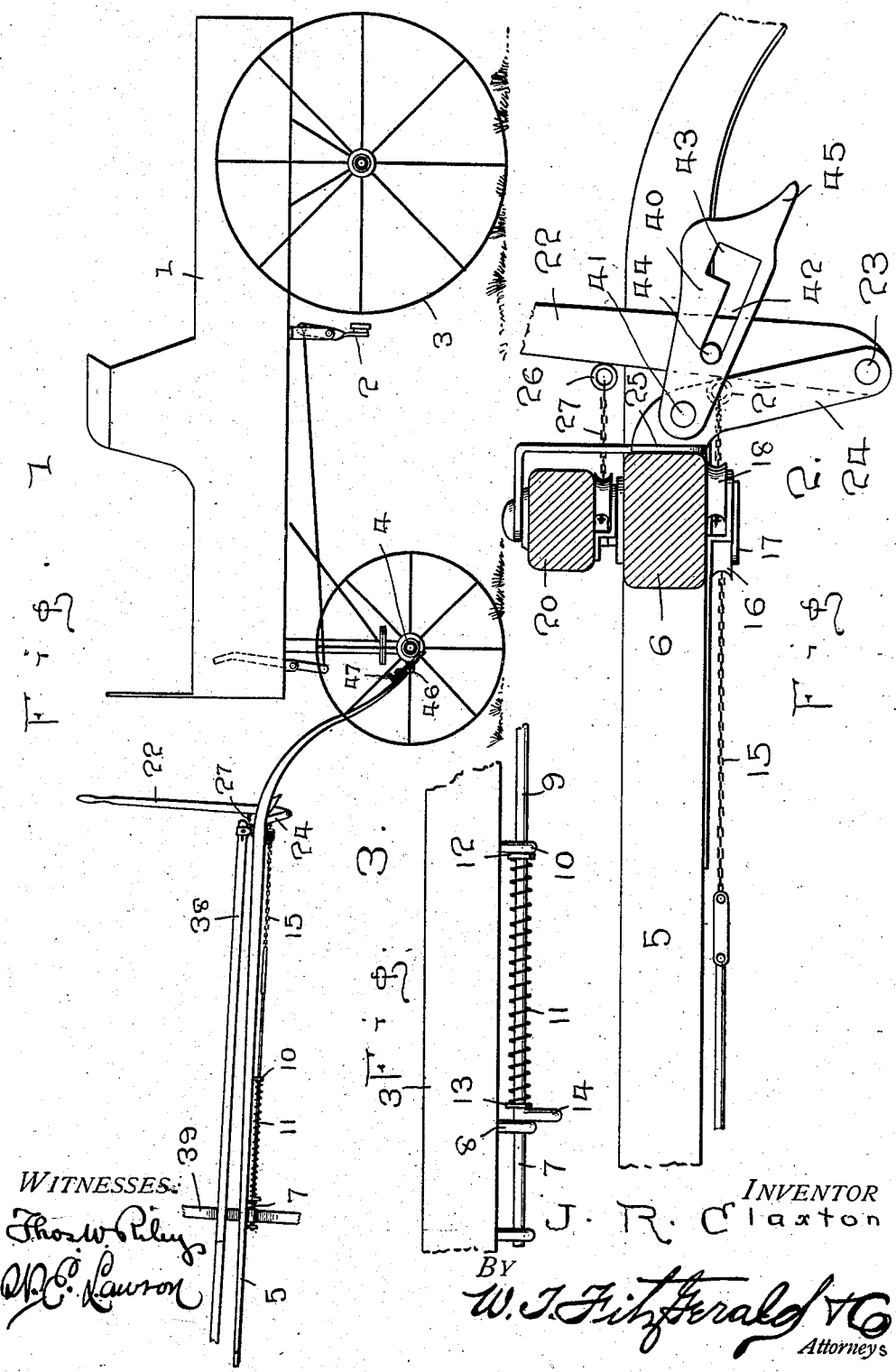

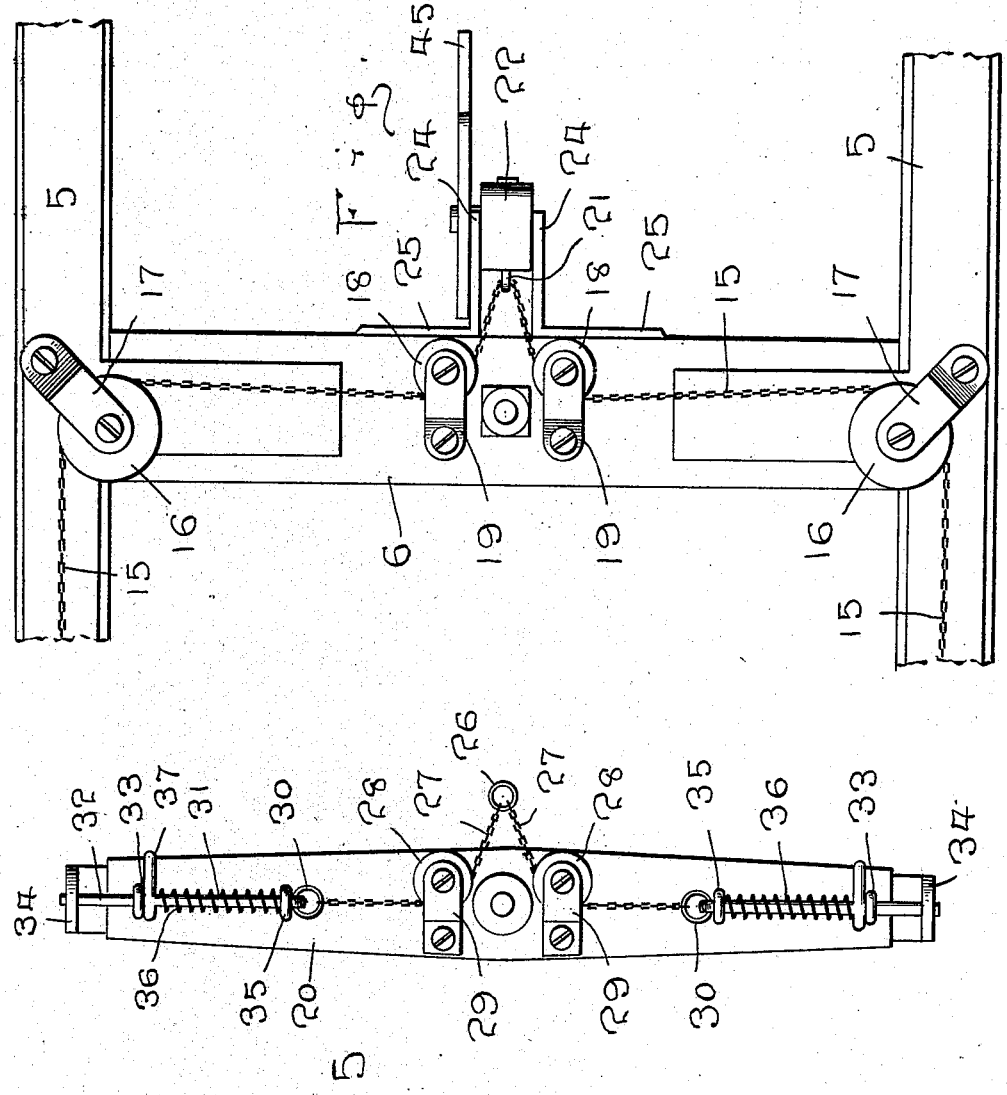

JOHN R. CLAXTON, OF DOON, IOWA.

HORSE-DETACHER.

No. 900,483.  Specification of Letters Patent.  Patented Oct. 6, 1908.

Application filed June 2, 1908. Serial No. 436,277.

*To all whom it may concern:*

Be it known that I, JOHN R. CLAXTON, a citizen of the United States, residing at Doon, in the county of Lyon and State of Iowa, have invented certain new and useful Improvements in Horse-Detachers, and I do hereby declare the following to be a full, clear and exact description of the invention, such as will enable others skilled in the art to which it appertains to make and use the same.

This invention relates to new and useful improvements in horse detachers and it is the primary object of the invention to provide a novel device of this character wherein the driver, or other occupant of the vehicle may quickly and safely release the horse from the vehicle in case of a runaway, or for other purposes.

It is also an object of the invention to provide a novel device of this character which, when operated, will release both the trace hooks and the hold back or breech hooks.

It is also an object of the invention to provide a novel device of this character which will be simple in construction, efficient and advantageous in practice and comparatively inexpensive to manufacture.

With the above and other objects in view the invention consists in the details of construction and in the novel arrangement and combination of parts to be hereinafter more particularly referred to.

In describing the invention in detail reference will be had to the accompanying drawings forming part of this specification wherein like characters of reference denote corresponding parts in the several views, and in which, Figure 1 is a view in side elevation of a vehicle and its shafts showing the invention applied thereto. Fig. 2 is an enlarged view partly in section and partly in elevation illustrating the invention in detail. Fig. 3 is an enlarged fragmentary view in elevation of the hold back or breech hook employed in the invention. Fig. 4 is an enlarged fragmentary plan view of the shafts of the vehicle showing the invention in applied position with the whiffle-tree removed. Fig. 5 is a bottom plan view of the whiffle-tree, detached, the connecting ring of the operating lever being shown.

In the drawings 1 denotes a vehicle, which may be of any desired structure having the brake mechanism 2 acting in conjunction with the rear supporting wheels 3. While the brake mechanism in its detail forms no part of the present invention it has been found most essential that a brake mechanism be employed in the successful operation of the invention, and that said brake mechanism be as simple and convenient as it is necessary that as soon as the animal is released it should be stopped, as is thought to be obvious.

Suitably secured to the forward axle 4 of the vehicle are the shafts 5, connected as usual by the cross bar 6. Each of the shafts is provided with the hold-back or breech hook 7, which passes through the brackets 8 and is provided with a rearwardly projecting extension 9, which passes through an additional bracket 10. This extension is embraced or surrounded by an expansible coil spring 11, which abuts a washer adjacent the bracket 10 and a washer 13 adjacent a depending finger 14. This finger 14 is to allow the hook to be manually operated when it is desired to hitch an animal to the shafts.

The inner end of the extension 9 has secured thereto the end of a flexible connection 15, in this instance, a chain which passes around a pulley 16, suitably mounted in a bracket 17 adjacent an end of the cross bar 6. The connection then passes inwardly beneath the cross bar and passes around a second pulley 18, mounted in a bracket 19 and positioned to one side of the pivot point of the whiffle-tree 20. The connection 15 is then secured to an eye 21 carried by an upstanding lever 22 suitably pivoted at its lower end.

The lever 22 is of such length as to be of convenient access by the driver, or other occupant of the vehicle, and it has its lower end pivoted as at 23 between two depending parallel plates 24. These plates have their upper end portions 25 angular, and these angular portions are suitably secured to the rear face of the cross bar 6. It might be also well to state that the plates 24 depend upon the cross bar 6 on an outward incline in order to permit proper movement of the lever 22.

The lever 22 is provided a distance above the eye 21 with a second eye 26. This eye 26 is engaged by the ends of flexible connections 27, each of which pass around a pulley 28 suitably mounted within a bracket 29 fixed to the under surface of the whiffle-tree 20, said pulley 28 being positioned adjacent the pivoted point of the whiffle-tree. The connection 27 is also in engagement with an eye 30 carried by the inner end of an extension 31, of the trace hooks 32. The trace hooks 32 pass through a bracket 33 and the trace clip 34, while the extension 31 projects through a bracket 35.

The extension 31 is surrounded by an expansible coil spring 36 interposed between and contacting with the brackets 33 and 35 to normally hold the hook 32 projected through the clip 34. At the junction of the extension 31 with the hook 32 is a laterally projecting finger 37 to permit the hook 32 being manually operated.

From the foregoing description it is thought to be obvious that should the animal within the shafts and hitched thereto become unruly, should run away, or should it be desired to quickly unhitch the animal it is only necessary to pull upon the lever 22, as such pull on the lever 22 together with the flexible connections 15 and 27 will release the hooks 32 from the traces 38 and the hooks 7 from the hold-back or breech straps 39.

In order that the hooks 7 and 32 may be held in an inoperative or open position, a gravity dog 40 is pivoted as at 41 to one of the plates 24 adjacent its upper end. This dog 40 is provided with an L-shaped slot 42, the foot 43 of the slot extending upwardly.

The lever 22 is provided with a laterally projecting post 44, which projects through the slot 42 and when the lever has been pulled back sufficiently to release the hooks 7 and 32 the pawl 40 will position the post 44 within the stem 43 of the slot 42, and by contacting with the walls of the stem 43 the post will hold the lever 22 against return and thereby the hooks 7 and 32 will remain open until the pawl 40 is sufficiently elevated to release the post 44. To release the post 44 the free end of the dog 40 is provided with an extension or finger 45.

The shafts 5 are pivotally held by brackets 46 projecting forwardly from the forward axle 4 and each of the shafts has adjustably mounted thereon the clip 47 which is adapted to pass within the bracket and in contact with the axle 4. This clip 47 possesses sufficient resiliency as to in no way interfere with the necessary movement of the shaft when an animal is hitched thereto and it further possesses sufficient rigidity to hold the shafts 5 elevated after the animal has been released therefrom. This is of great benefit as it prevents the ends of the shafts from contacting with the road way and thereby increasing liability of injury to the occupants of the vehicle and the possibility of demolishing the vehicle.

I claim:

1. In combination with the shafts of a vehicle having breech hooks thereon and having a whiffle-tree provided with trace hooks; of plates carried by the cross bar of the shafts, a lever pivoted between the plates, connections between the lever and the trace hooks and the breech hooks, whereby a movement of the lever in one direction will impart movement to said hooks, and means carried by one of the plates acting in conjunction with the lever for holding the lever against return movement when said lever has been moved in one direction.

2. In combination with the shafts of a vehicle having breech hooks thereon and having a whiffle-tree provided with trace hooks; of plates carried by the cross bar of the shafts, a lever pivoted between the plates, connections between the lever and the trace hooks and the breech hooks, whereby a movement of the lever in one direction will impart movement to said hooks, a gravity dog pivoted to one of the plates, said dog having an L-shaped slot therein, the stem of the slot extending upwardly and a post on the lever projecting through the slot.

In testimony whereof I have signed my name to this specification in the presence of two subscribing witnesses.

JOHN R. CLAXTON.

Witnesses:
C. R. McDOWELL,
W. C. BENTLEY.